US012087565B2

(12) United States Patent
Ishiguro et al.

(10) Patent No.: US 12,087,565 B2
(45) Date of Patent: Sep. 10, 2024

(54) MASS SPECTROMETER

(71) Applicant: Hitachi High-Tech Corporation, Tokyo (JP)

(72) Inventors: Kouji Ishiguro, Tokyo (JP); Kiyomi Yoshinari, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 380 days.

(21) Appl. No.: 17/597,245

(22) PCT Filed: Jul. 10, 2019

(86) PCT No.: PCT/JP2019/027237
§ 371 (c)(1),
(2) Date: Dec. 30, 2021

(87) PCT Pub. No.: WO2021/005730
PCT Pub. Date: Jan. 14, 2021

(65) Prior Publication Data

US 2022/0319825 A1 Oct. 6, 2022

(51) Int. Cl.
*H01J 49/00* (2006.01)
*H01J 49/04* (2006.01)
*H01J 49/16* (2006.01)

(52) U.S. Cl.
CPC ...... *H01J 49/0422* (2013.01); *H01J 49/0036* (2013.01); *H01J 49/165* (2013.01)

(58) Field of Classification Search
CPC .. H01J 49/0422; H01J 49/0036; H01J 49/165; H01J 49/24
USPC ........................................ 250/281, 282, 288
See application file for complete search history.

(56) References Cited

U.S. PATENT DOCUMENTS

| | | | | |
|---|---|---|---|---|
| 9,240,311 | B2 | 1/2016 | Whitehouse et al. | |
| 2007/0045532 | A1 | 3/2007 | Brennen et al. | |
| 2008/0067336 | A1 | 3/2008 | Goodley et al. | |
| 2008/0296485 | A1 | 12/2008 | Benter et al. | |
| 2012/0018632 | A1* | 1/2012 | Whitehouse .......... | H01J 49/045 250/288 |
| 2016/0196965 | A1 | 7/2016 | Satake et al. | |
| 2016/0300703 | A1* | 10/2016 | Hasegawa ............ | H01J 49/168 |

FOREIGN PATENT DOCUMENTS

| | | | |
|---|---|---|---|
| JP | 2001-272375 | A | 10/2001 |
| JP | 2004-28763 | A | 1/2004 |
| JP | 2007-66903 | A | 3/2007 |

(Continued)

OTHER PUBLICATIONS

International Search Report (PCT/ISA/210) issued in PCT Application No. PCT/JP2019/027237 dated Aug. 27, 2019 with English translation (four (4) pages).

(Continued)

*Primary Examiner* — Michael Maskell
(74) *Attorney, Agent, or Firm* — Crowell & Moring LLP

(57) ABSTRACT

An object of the invention is to provide a mass spectrometer capable of preventing a sample from remaining inside an ion source container for a long time. In the mass spectrometer according to the invention, in addition to a first gas used for ionizing an ion source, a second gas flowing toward an exhaust unit along an inner wall of the ion source container is supplied inside the ion source container (see FIG. 1).

11 Claims, 10 Drawing Sheets

(56) References Cited

FOREIGN PATENT DOCUMENTS

| | | | |
|---|---|---|---|
| JP | 6181764 | B2 | 8/2017 |
| WO | WO 2006/060130 | A2 | 6/2006 |
| WO | WO 2014/084015 | A1 | 1/2017 |

OTHER PUBLICATIONS

Japanese-language Written Opinion (PCT/ISA/237) issued in PCT Application No. PCT/JP2019/027237 dated Aug. 27, 2019 (four (4) pages).

Extended European Search Report issued in European Application No. 19936872.1 dated Feb. 27, 2023 (nine (9) pages).

* cited by examiner

MASS SPECTROMETER

TECHNICAL FIELD

The present invention relates to a mass spectrometer using an ion source.

BACKGROUND ART

Ionization by an electrospray ionization (ESI) method is performed in the following procedure. A sample solution flows through a capillary to which a high voltage is applied, a sample is ejected from a tip end of the capillary, heated gas is blown from a periphery, and the sample solution is sprayed to generate charged droplets. When the charged droplets are evaporated and split, ions are generated.

In a mass spectrometer using ions generated from an ion source, the ions are drawn in a low vacuum vacuumed by a vacuum pump by an electric field or the like. The ions pass through an ion lens having various functions, and are then guided to a quadrupole analysis unit. The quadrupole analysis unit includes four metal rods. A high frequency voltage and a DC voltage are applied to these metal rods, and specific ions are separated by passing only those having a ratio m/z of a mass (m) and an electric charge (z) of the specific ions.

Components are analyzed by detecting the separated ions with an ion detector. A quadrupole analysis unit including triple stations is called a triple quadrupole analysis unit. In this configuration, mass separation is performed in a first stage and a third stage, and collision induced dissociation (CID) is performed in a second stage.

A technique described in the following PTL 1 provides a second gas source that supplies a second gas to an ionization region (a region between an ion source and a collection conduit) at a predetermined flow rate. The second gas is supplied from a direction perpendicular to a direction in which the ion source emits a gas.

In the following PTL 2, an ESI ion source and an atmospheric pressure chemical ionization (APCI) ion source are arranged in the same ion source container, a distance between an ionization probe outlet end and a heating chamber is changed by a driving device, and two ionization methods are individually performed to quickly change an ESI mode and an APCI mode, so that a throughput of an apparatus is increased.

CITATION LIST

Patent Literature

PTL 1: JP-A-2007-066903
PTL 2: Japanese Patent No. 6181764

SUMMARY OF INVENTION

Technical Problem

When the sample solution is not smoothly discharged from the inside of the ion source and remains for a long time and a sample to be analyzed next is of the same type, a previous remaining component amount is overlapped in an analysis result, and a detected signal amount is increased. That is, accuracy of a quantitative analysis is reduced. In addition, since a background component that is noise remains, a signal (S)/noise (N) ratio changes. When a sample to be analyzed next is different from the previous sample and the previous sample remains, a signal of a sample that is not supposed to be present is detected. That is, a result of an erroneous detection is obtained.

When the sample is not immediately discharged from the inside of the ion source and remains for a long time, an amount of the sample inside the ion source is increased, and the amount of the sample flowing into the ion lens on a downstream side is increased. As a result, an amount of the sample adhered to an ion source wall surface or the ion lens is increased, and a maintenance cycle for removing the sample is shortened. As a result, problems such as a decrease in a processing throughput of the apparatus and an increase in maintenance cost occur.

In PTLs 1 and 2, as described above, it is considered that the problems caused by the sample solution remaining in the ion source for a long time is not particularly considered. The invention has been made in view of the above problems, and an object of the invention is to provide a mass spectrometer capable of preventing a sample from remaining inside an ion source container for a long time.

Solution to Problem

In the mass spectrometer according to the invention, in addition to a first gas used for ionizing an ion source, a second gas flowing toward an exhaust unit along an inner wall of the ion source container is supplied inside the ion source container.

Advantageous Effect

According to the mass spectrometer of the invention, a flow of the second gas (flow of a curtain gas) along a wall surface of the ion source container is generated, and a circulation flow such as a vortex can be prevented from being generated inside the ion source. As a result, an amount of the sample adhered to the wall surface or the like can be reduced.

DESCRIPTION OF EMBODIMENTS

First Embodiment

Figure 1:
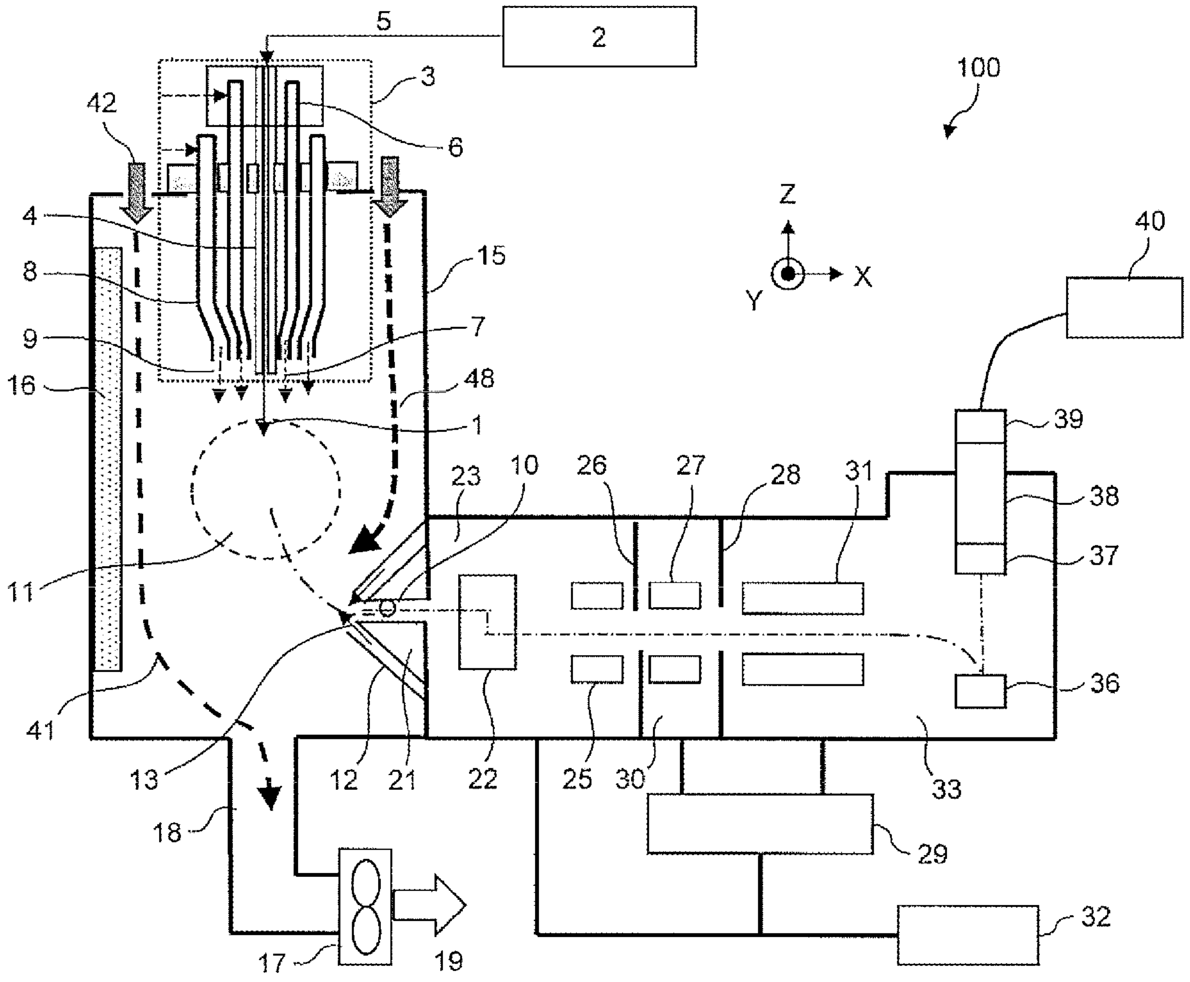
FIG. 1 is a cross-sectional view showing a configuration of a mass spectrometer 100 according to a first embodiment.

FIG. 1 is a cross-sectional view showing a configuration of a mass spectrometer 100 according to a first embodiment of the invention. The mass spectrometer 100 is a device that analyzes components of a sample by ions ionized by an ion source 3. A pressure of tens of megapascals or less is applied to a sample solution 1, in which the sample (object to be analyzed) is dissolved in a solvent such as methanol or water, by a syringe pump 2, and a liquid is supplied to a capillary 4 in the ion source 3 to which a high voltage is applied via a peak tube 5. A tip end of the capillary 4 is an ultrafine tube having an inner diameter of tens to hundreds of micrometers.

The sample solution 1 is injected from the tip end of the capillary 4. A positive or negative voltage of kilovolts is applied to the capillary 4. A nebulizer gas pipe 6 having a concentric shaft is provided on an outer periphery of the capillary 4. A nebulizer gas (atomized gas) 7 flows in the nebulizer gas pipe 6 at a speed of liters/minute. Miniaturized droplets charged to the same sign as the voltage applied to the capillary 4 are generated downstream of the capillary 4. An auxiliary heating gas pipe 8 having a concentric shaft is further provided on an outer periphery of the nebulizer gas pipe 6. The auxiliary heating gas pipe 8 is heated by a heater having a capacity of hundreds of watts (not shown), and an auxiliary heating gas 9 such as a nitrogen gas is injected at a flow rate of tens of liters/minute. As a result, vaporization and miniaturization of the droplets are further accelerated. When a surface electric field increase of the miniaturized droplets is increased and a repulsive force between electric charges exceeds a surface tension of the liquid, the droplets are split. Next, ion evaporation occurs, and ions 10 are generated in an ion generation region 11. The ion generation region 11 is formed in a downstream region where the sample solution 1 is ejected.

The ions 10 are taken in by an electric field of a counter plate 12 in which a hole having a diameter of millimeters is opened in a triangular pyramid shape. Neutral particles other than the ions 10 and the sample in a liquid state that is not vaporized are also taken in from the counter plate 12 to a downstream side by a flow generated by a vacuum difference. Since the neutral particles other than the ions, the sample solution 1 in the liquid state that is not vaporized, and the like cause contamination, a counter gas 13 flows back to an ion source 3 side at a flow rate of liters/minute so as to prevent the neutral particles and the sample solution from entering the inside of the counter plate 12 as much as possible.

Surfaces of the counter plate 12, a first pore 21, and an axis shifting unit 22 are heated to about 200° C. by a heater (not shown) in order to reduce the contamination due to sample adhesion as much as possible. In some cases, subsequent ion lenses (for example, ion guide 25) are also heated.

The sample solution 1 and the like that is not taken into the counter plate 12 passes through an exhaust pipe 18 by an air flow of a blower 17 and is discharged (19). A flow rate of the nebulizer gas 7 is about 3 liters/minute, a flow rate of the auxiliary heating gas 9 is about 10 liters/minute, a flow rate of the counter gas 13 is about 5 liters/minute, and a flow rate of a gas flowing downstream from the counter plate 12 is about 5 liters/minute, so that a difference of about 13 liters/minute is discharged from the blower 17. About 30% of a gas flow rate including the sample solution 1 flows toward the blower 17.

The blower 17 may have a constant performance (air volume-pressure loss value) in a rotation speed, a supply voltage, and a frequency, or may have an exhaust performance that is changeable by changing the rotation speed.

Originally, the ion source container 15, the exhaust pipe 18, and the blower 17 to which the sample is adhered are also desired to be heated to a high temperature of about 200° C. so that the sample is not adhered. However, problems such as a large required heater capacity and an increased size of the device by adopting a complicated structure due to a heat insulating structure occur, and it is practically difficult to implement the process. Therefore, in practice, the sample solution 1 is adhered to the ion source container 15, the exhaust pipe 18, the blower 17, and the like. After the sample solution 1 is adhered, the sample solution 1 is separated and floated. When a component of the sample is detected, this detection becomes a cause of erroneous detection in which a component that is not supposed to be detected is detected. In addition, even when a sample of the same type is analyzed, a next detection amount is increased from an originally correct amount, and measurement accuracy of a quantitative analysis is reduced. In addition, since an amount of the component flowing into the ion lens downstream of the counter plate 12 is increased and a maintenance cycle is necessary to be shortened, problems such as an increase in maintenance cost and a decrease in a throughput of an apparatus occur.

The ion source 3 includes the capillary 4, the nebulizer gas pipe 6, the auxiliary heating gas pipe 8, a heater (not shown), a high-voltage applying structure, an electric insulator, a gas introducing structure, a stage (not shown) that adjusts a position of the capillary or the like in X, Y, and Z axis directions shown in FIG. 1 by millimeters, and the like. By this stage, the position of the capillary 4 is adjusted so as to optimize a performance such as device sensitivity. The nitrogen gas (first gas) whose flow rate and pressure are controlled is supplied from a gas control unit (not shown) to the nebulizer gas pipe 6 and the auxiliary heating gas pipe 8.

The ion source 3 is fixed to the ion source container 15 by fixing a stage portion with a screw. The ion source container 15 is made of metal such as aluminum or stainless steel. In order to monitor a state or the like inside the ion source container 15, a monitoring window 16 made of transparent glass, resin, or the like is arranged on a side surface of the ion source container 15.

When the capillary 4, which is a consumable item, is replaced, the peak tube 5 is removed, only the capillary 4 is replaced, or the capillary 4 is taken out together with the nebulizer gas pipe 6 and replaced with a new one.

The first pore 21 having a hole diameter of less than 1 millimeter and a length of tens of millimeters is provided downstream of the counter plate 12. Due to a large flow path resistance of a hole portion, an inflow amount to the first pore 21 is limited.

The axis shifting unit 22 is provided downstream of the first pore 21. Since the component of the sample solution 1 in a liquid state or the like travels straight, the component collides with an inner wall of the axis shifting unit 22 and is removed. On the other hand, ions and light mass components flow downstream along the flow.

The ion guide 25 of octopole and quadrupole that focuses ions are arranged downstream of the axis shifting unit 22. A high-frequency potential of positive and negative are applied to a Q rod (a round bar of metal or ceramics) adjacent to the ion guide 25, and the ions 10 are captured in a region surrounded by the Q rod. An axis of an octupole portion and an axis of a quadrupole portion are offset from each other by millimeters in a direction orthogonal to an ion traveling axis. As a result, the neutral particles and the like are removed, and only necessary ion components are moved downstream by an electric field in an ion traveling axis direction.

A second pore 26 having a flat plate shape that has a hole having a diameter of millimeters and a plate thickness of millimeters is provided downstream of the ion guide 25. By arranging a plate having a pore, a room having different vacuum degrees is formed, unnecessary ions are blocked by a pore portion, and only necessary components are taken out. The first pore 21, the axis shifting unit 22, the ion guide 25, and the second pore 26 are arranged in a first differential exhaust chamber 23. The first differential exhaust chamber 23 is evacuated by a dry pump 32 and kept at a vacuum degree of about hundreds of pascals.

A quadrupole called an ion thermalizer 27 (collision damper) is provided downstream of the second pore 26. Similarly to the ion guide 25, a high-frequency potential of positive and negative is applied to an adjacent Q rod, and the ions 10 are captured in a region surrounded by the Q rod. Kinetic energy of the ions 10 is reduced due to collision with a residual gas, and the ions are focused in the vicinity of the ion traveling axis. A third pore 28 having a flat plate shape that has a hole having a diameter of millimeters and a plate thickness of millimeters is provided downstream of the ion thermalizer 27. The second pore 26, the ion thermalizer 27, and the third pore 28 are arranged in a second differential exhaust chamber 30. The second differential exhaust chamber 30 is connected to a first exhaust port of a turbo molecular pump 29, and is maintained at a vacuum degree of pascals.

A triple quadrupole (mass filter) 31 IS provided downstream of the third pore 28. An ion detector including the triple quadrupole 31, a conversion dynode 36, a scintillator 37, an electron multiplier 38, and the like is arranged in an analysis chamber 33. The analysis chamber 33 is evacuated from a second exhaust port of the turbo molecular pump 29 and is maintained at a vacuum degree of $1E^{-3}$ pascals or less. A downstream side of the turbo molecular pump 29 is connected to the dry pump 32 to exhaust gas therefrom. The triple quadrupole 31 includes a first quadrupole, a collision chamber, and a second quadrupole from an upstream side. The first quadrupole allows only precursor ions of a particular mass-to-charge ratio (m/z) to pass by controlling a high-frequency voltage applied thereto. The ions 10 are guided to the collision chamber into which a collision gas (helium, nitrogen gas, or the like) located downstream of the ions 10 was introduced. The ions 10 collide with the gas, and are cleaved at sites where chemical bonds are weak. The cleaved ions 10 are referred to as product ions. The ions 10 are incident on the second quadrupole located downstream of the ions 10 and subjected to mass separation, and thereby the quantitative analysis can be performed with high sensitivity.

The ions 10 are incident on the conversion dynode 36 by an electric field. Secondary electrons are generated by an ion collision, attracted by the electric field, and incident on the scintillator 37. Photoelectrons are generated, amplified by the electron multiplier 38, and converted by an analog/digital converter 39. A mass spectrum based on a digital value is displayed on a monitor 40. A sample component is specified by being compared with known data collected in advance. With these configurations, the first differential exhaust chamber 23 in FIG. 1 and each configuration portion arranged downstream of the first differential exhaust chamber 23 function as an ion measuring unit.

A gas 42 (desirably, inert gas such as nitrogen) flows from an upstream side of the ion generation region 11. The gas 42 flows from a hole portion or the like provided in the ion source container 15. Alternatively, a part of a spacer is inserted into an attachment surface between a fixed flange of the ion source 3 and the ion source container 15, and the gas 42 flows from a gap between the fixed flange and the ion source container 15. A reason why the nitrogen gas is desirable is that an organic solvent such as methanol may explode in a certain oxygen concentration region and cause ignition, and the nitrogen gas is to prevent the situation. As a gas introduction position, a through hole may be provided in a part of the ion source 3 to flow the gas 42 into the inside of the ion source container 15.

An inflow amount of the gas 42 is determined by (a) an area of the hole portion, an area of the gap, a flow path resistance of the flow, a flow path resistance value at each portion determined by a structure or the like inside the ion source container 15, (b) the flow rate flowing downstream from the first pore 21, (c) the flow rate of the nebulizer gas 7, (d) the flow rate of the auxiliary heating gas 9, (e) the flow rate of the sample solution 1, and (f) a discharge capacity determined by the rotation speed of the blower 17.

The area of the hole portion, the area of the gap, a shape of the ion source container 15, and the structure inside the ion source container 15 have almost fixed values once the device is manufactured. The flow rate flowing downstream from the first pores 21 is a product of a pressure difference between the upstream side (atmosphere) and the downstream side of the first pore 21 and a conductance value determined by a shape of an elongated hole. In addition, when analysis conditions are determined, the flow rate of the nebulizer gas 7 and the flow rate of the auxiliary heating gas 9 are determined. In order to change a state of the flow of the gas 42 in the ion source container 15, it is necessary to change the inflow amount of the gas 42. For this purpose, it is necessary to change the rotation speed of the blower 17.

The gas 42 flows from an outer peripheral side (an inner wall surface side of the ion source container 15) of the ion generation region 11, and flows as a curtain gas 41 flowing toward the exhaust pipe 18 along an inner wall surface of the ion source container 15. The curtain gas 41 flows mainly to an outer side of the ion generation region 11. A reason for flowing to the outer side is that the ion generation region 11 contains a large amount of the ions 10 and the sample solution 1, and thus there is a high possibility that the flow in this region is disturbed and the device sensitivity is reduced. Another reason is that a gas flow toward the inner wall of the ion source container 15 is generated, the amount of the sample adhered to the inner wall of the ion source container 15 is increased, and the problems already described occur.

Figure 2:
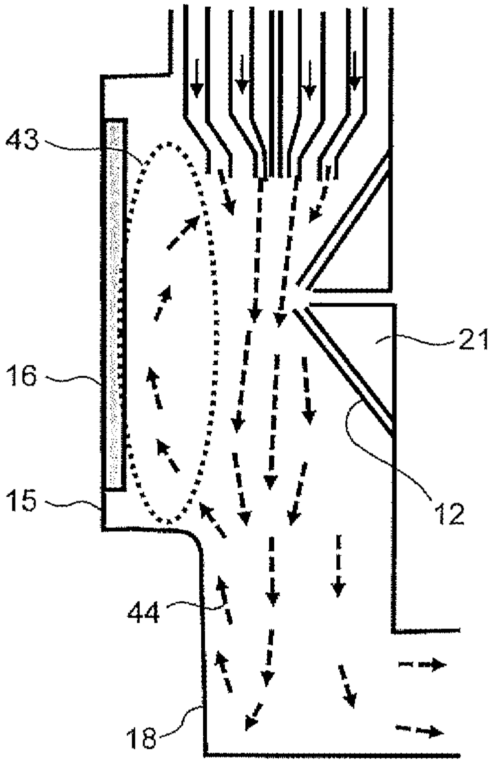
FIG. 2 is a schematic diagram showing a result of simulating a flow inside an ion source of the related art.

FIG. 2 is a schematic diagram showing a result of simulating the flow inside an ion source of the related art. A broken line arrow in the drawing indicates a direction of a gas flow 44. A length of the arrow and a flow velocity are not proportional to each other. Calculation conditions are such that the flow rate of the nebulizer gas 7 is 2 liters/minute, the flow rate of the auxiliary heating gas 9 is 10 liters/minute, and the flow rate of the counter gas 13 is 5 liters/minute. The flow rate flowing out from the first pore 21 is about 5 liters/minute. A discharge amount of the blower 17 is about 12 liters/minute. A flow velocity at an outlet of the nebulizer gas pipe 6 exceeds a sound velocity at about 380 meters/ second. A flow velocity at an outlet of the auxiliary heating gas pipe 8 is about 4 meters/second, and there is a large difference of about 100 times. A distance from the nebulizer gas pipes 6 to the ion source container 15 is tens of millimeters. Assuming that the flow velocity at the outlet of the nebulizer gas pipe 6 is maintained as it is and proceeds, the gas reaches the inner wall of the ion source container 15 at less than 1 millisecond. A part of the ions are taken into the inside of the counter plate 12 by the electric field within a short time.

The gas containing the sample solution 1 collides with a lower portion of the exhaust pipe 18 to generate a reverse flow and form a circulation flow (vortex) 43. The gas containing the sample solution 1 collides with the ion source container 15 and the monitoring window 16 at a temperature lower than about 200° C., and part of the gas adheres to the ion source container 15 and the monitoring window 16. A part of the sample solution 1 is continuously supplied to the circulation flow (vortex) 43, and the sample is adhered to the inner surface of the ion source container 15 for a long time.

Figure 3:
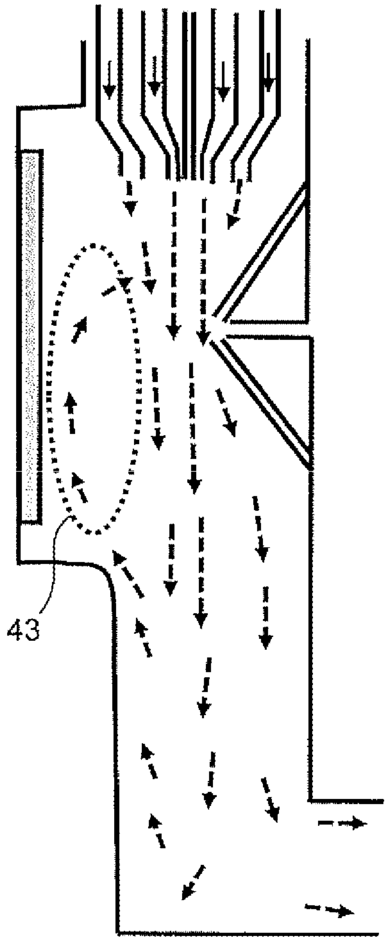
FIG. 3 shows a result of simulating a flow in an ion source container 15 when a length of an exhaust pipe 18 is increased in order to reduce a reverse flow as compared with FIG. 2.

FIG. 3 shows a result of simulating the flow in the ion source container 15 when a length of the exhaust pipe 18 is increased in order to reduce the reverse flow as compared with FIG. 2. By increasing the length of the exhaust pipe 18, the flow velocity of the gas containing the sample at the lower portion of the exhaust pipe 18 is reduced, and the reverse flow is less likely to occur. However, since the size of the device is limited, the length of the exhaust pipe 18 is limited. In a structure of FIG. 3, a reverse flow region is reduced, but the circulation flow (vortex) 43 is present. Therefore, as in FIG. 2, the sample is adhered to the ion source container 15. Although an adhesion amount can be reduced, the above problems are still generated.

Figure 4:
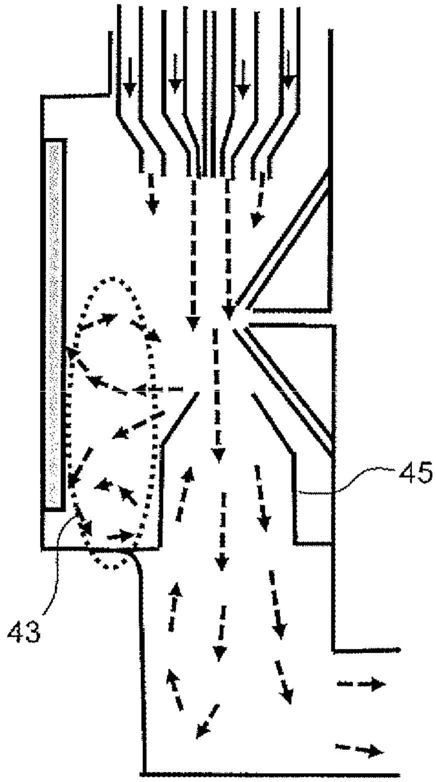
FIG. 4 shows a result of simulating the flow in the ion source container 15 when a centralized exhaust pipe 45 is added to a structure of FIG. 2.

FIG. 4 shows a result of simulating the flow in the ion source container 15 when the centralized exhaust pipe 45 is added to the structure of FIG. 2. The centralized exhaust pipe 45 makes it possible to reduce the reverse flow generated by the gas colliding with the lower portion of the exhaust pipe 18. On the other hand, a part of the gas containing the sample solution 1 collides with the centralized exhaust pipe 45, and the circulation flow (vortex) 43 shown in the figure is generated. In a calculation, two circulation flows (vortex) 43 shown in the figure are generated. As in FIG. 2, a part of the sample solution 1 is continuously supplied to the circulation flow (vortex) 43, and the sample is adhered to the inner surface of the ion source container 15 for a long time.

Figure 5:
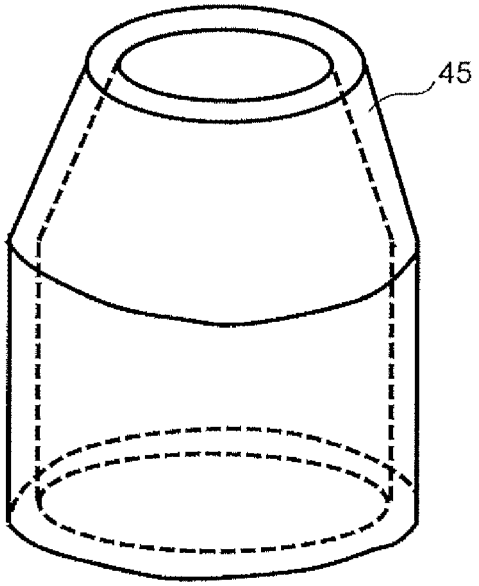
FIG. 5 is a schematic diagram of the centralized exhaust pipe 45.

FIG. 5 is a schematic diagram of the centralized exhaust pipe 45. The centralized exhaust pipe 45 is a metal pipe having an outermost diameter of about 30 millimeters and a height of about 60 millimeters, and a diameter of a tip end portion thereof is tapered. The centralized exhaust pipe 45 is arranged in the vicinity of the counter plate 12. When an analysis operation is performed using various sample solutions 1, a part of the sample solutions 1 is adhered to the centralized exhaust pipe 45. The adhesion is a reason of the erroneous detection. Therefore, the centralized exhaust pipe 45 is kept at a high temperature by heat-insulating and heating with the heater.

Figure 6:
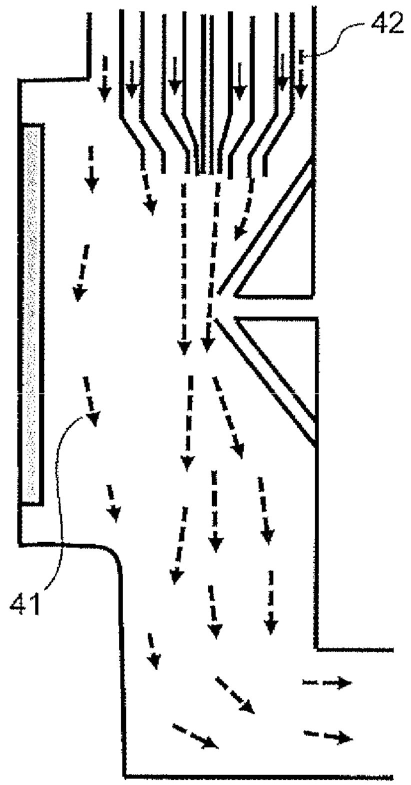
FIG. 6 is a diagram showing a state of the flow inside the ion source container 15 according to the first embodiment.

FIG. 6 is a diagram showing a state of the flow inside the ion source container 15 according to the first embodiment. The gas 42 flows in at a flow rate of 20 liters/minute. Other calculation conditions are the same as those in FIG. 2. A part of the gas 42 is a flow of the curtain gas 41 along the inner wall of the ion source container 15. The curtain gas 41 acts to push the circulation flow (vortex) 43 shown in FIG. 2 to the downstream side. Accordingly, it is possible to reduce the amount of the sample adhered to the inner wall surface of the ion source container 15, and it is possible to solve the problems caused by the adhesion.

Figure 7:
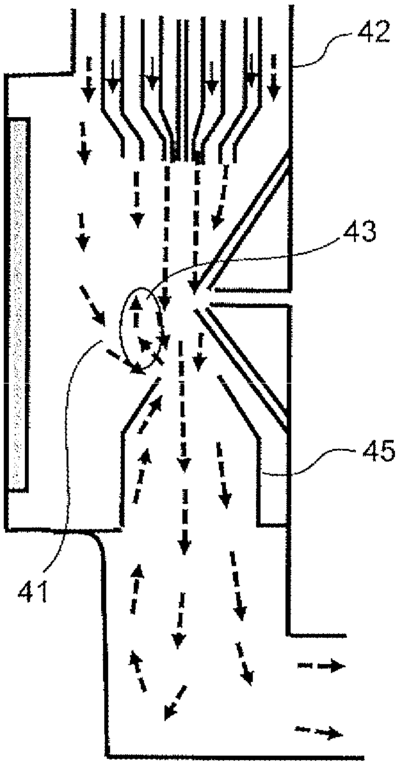
FIG. 7 is a diagram showing a state of the flow inside the ion source container 15 when the centralized exhaust pipe 45 is added to a structure of FIG. 6.

FIG. 7 is a diagram showing a state of the flow inside the ion source container 15 when the centralized exhaust pipe 45 is added to the structure of FIG. 6. The flow rate of the gas 42 is 20 liters/minute as in FIG. 6. The other calculation conditions are the same as those in FIG. 2. An intake port of the centralized exhaust pipe 45 is arranged at a position where a central axis of the ion source 3 is extended. The branched circulation flow (vortex) 43 shown in FIG. 4 is small. In addition, the flow does not reach the inner wall of the ion source container 15. As a result, it is possible to solve the problems caused by the sample adhesion.

Figure 8:
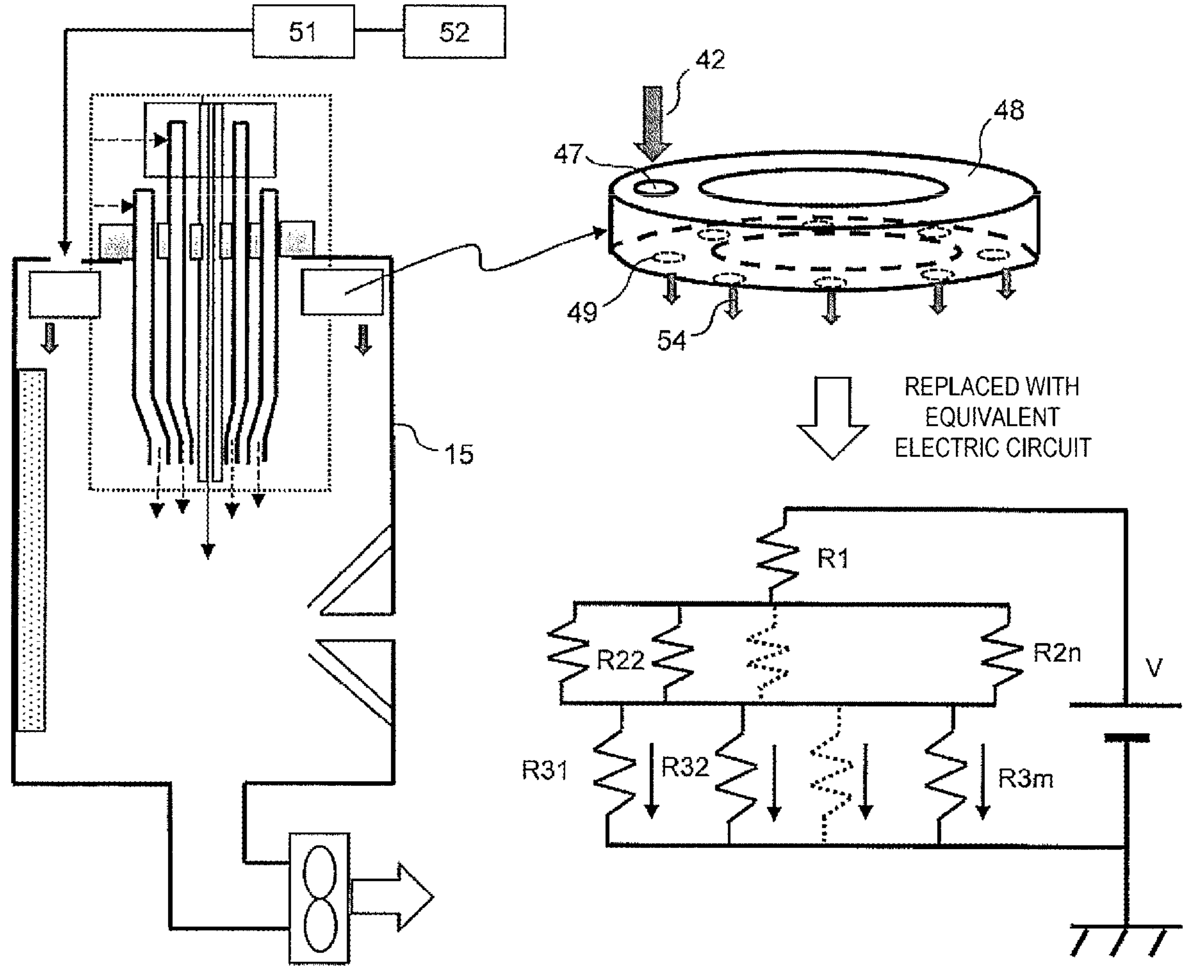
FIG. 8 is a diagram showing a structure of a gas supply member 48.

FIG. 8 is a diagram showing a structure of a gas supply member 48. The gas supply member 48 is a member that uniformly irradiates the gas 42, and is arranged at an inlet portion through which the gas 42 flows into the ion source container 15. The gas 42 is supplied into the ion source container 15 from a gas source 52 such as a nitrogen gas cylinder to an inlet hole 47 of the gas supply member 48 via a mass flow controller 51 (gas supply device) at a required pressure and flow rate. The gas 42 spreads inside the gas supply member 48. A large number of outlet holes 49 having a smaller diameter than the inlet hole 47 are provided on a lower surface of the gas supply member 48. The number of outlet holes 49 is larger than that of the inlet hole 47.

When a flow path resistance of the gas supply member 48 is replaced with an equivalent electric circuit, a lower right figure of FIG. 8 is obtained. A gas flow velocity corresponds to a current flow value I, and a difference between a gas pressure supplied from the mass flow controller 51 and a pressure inside the ion source container 15 corresponds to a potential difference V. R1 is a flow path resistance value in the inlet hole 47, R2*n* (n=1, 2 . . . n) is a flow path resistance value in each section inside the gas supply member 48, and R3*m* (m=1, 2 . . . m) is a flow path resistance value in the outlet holes 49. By reducing a hole diameter of the outlet holes 49 or making the flow path elongated, the flow path resistance value of R3*m* is increased (conductance is reduced). By setting R1 and R2*n*«R3*m*, V31 (gas outlet flow velocity in each section)≈V32≈ . . . ≈V3*m*«V1 (inlet flow velocity), and an outflow velocity at each gas outlet of the gas supply member 48 can be made uniform. That is, the gas 42 can be radiated in a shower shape.

A reason why the gas is uniformly radiated in the shower shape is to form a flow of the curtain gas 41 with less turbulence inside the ion source container 15. Preferably, a laminar flow is formed. When the flow is turbulent, the sample adhered to the inner wall of the ion source container 15 is likely to be detached, and the problems already described are likely to occur. Therefore, it can be said that the curtain gas 41 is preferably the laminar flow with less turbulence.

The gas source 52, the mass flow controller 51, the gas supply member 48, and the inlet hole to which the gas supply member 48 is attached function as a gas supply unit (second gas supply unit) that supplies the gas 42 to the inside of the ion source container 15. Discharge ports (outlet holes 49) of the gas 42 are arranged on the upstream side of the ion generation region 11 and on the outer side of the central axis of the ion source 3 (a side closer to the inner wall of the ion source container 15) in a direction along the gas flow. Similarly, the inlet hole, the gas source, and the like that supply the nebulizer gas 7 and the like function as a gas supply unit (first gas supply unit) that supplies these gases to the ion source 3.

First Embodiment: Summary

The mass spectrometer 100 according to the first embodiment flows the gas 42 toward the exhaust pipe 18 along the inner wall of the ion source container 15. As a result, the circulation flow 43 of the sample solution 1 can be prevented, and the sample can be smoothly discharged. As a result, the sample solution 1 is prevented from adhering to the inner wall of the ion source container 15 or the like, and staying time of a residual sample inside the ion source container 15 can be shortened. Therefore, when the same sample is continuously analyzed, since the residual time and amount of the sample are reduced, accuracy of the quantitative analysis is improved, and the S/N ratio is improved.

According to the mass spectrometer 100 of the first embodiment, even when different samples are analyzed, an influence of the previous sample can be reduced, and a risk of the erroneous detection and an erroneous determination can be reduced. Further, it is possible to minimize the adhesion amount of dirt to the downstream ion lens and to extend the maintenance cycle. As a result, a processing throughput of the apparatus can be improved, and the maintenance cost in a certain period of time (for example, per year) can be reduced.

In the first embodiment, the gas supply member 48 can make the flow velocity of the curtain gas 41 slower than that of other gases such as the nebulizer gas 7. In addition, the flow velocity of the curtain gas 41 may be similarly reduced by adjusting the flow velocity of the gas 42 by the mass flow controller 51, which will be described later.

Second Embodiment

Figure 9:
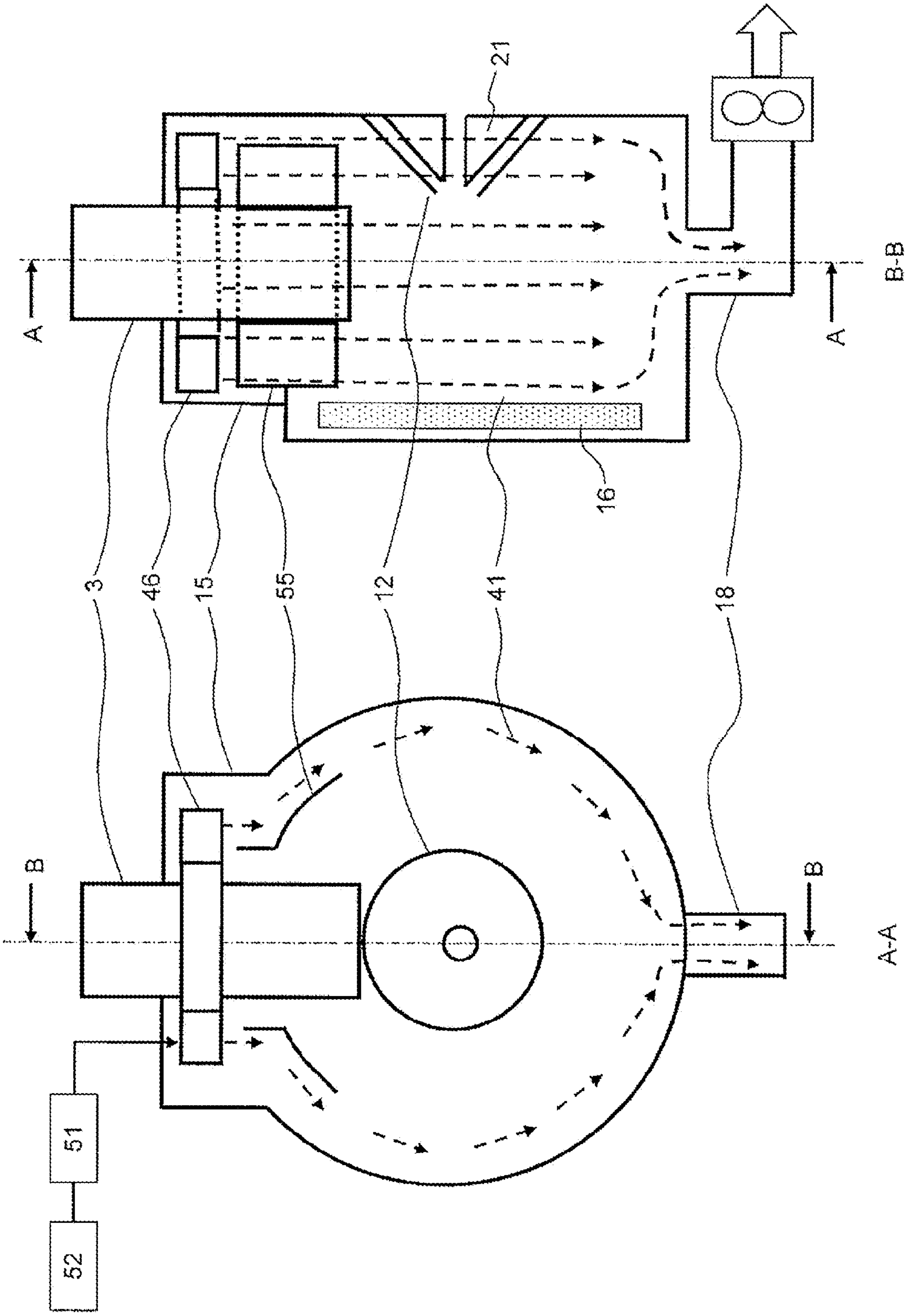
FIG. 9 is a configuration diagram of a mass spectrometer 100 according to a second embodiment.

FIG. 9 is a configuration diagram of the mass spectrometer 100 according to a second embodiment of the invention. The ion source container 15 has a cylindrical shape having an axis in an axial direction of the counter plates¥ 12. A flat portion is provided in the cylindrical shape, and the ion source 3 is mounted on a flat surface thereof. In the second embodiment, a guide plate 55 is further provided in addition to the configuration described in the first embodiment. The guide plate 55 is curved along an inner circumference of a cylinder of the ion source container 15, thereby guiding the curtain gas 41 along the inner wall of the ion source container 15. The guide plate 55 includes the flat portion for fixing and has an R surface along the inner wall of the ion source container 15. The flat portion of the guide plate 55 is fixed to the ion source container 15 by, for example, a screw. Other configurations are the same as those of the first embodiment.

According to the mass spectrometer 100 of the second embodiment, the curtain gas 41 can flow along the inner wall of the ion source container 15 by the guide plate 55. As a result, since the curtain gas 41 reliably avoids the ion generation region 11, it is possible to prevent an ion generation action in the ion generation region 11 from being inhibited.

Third Embodiment

A flow rate of the sample solution 1, a temperature of the ion source 3, a flow rate of the nebulizer gas 7, a flow rate of the auxiliary heating gas 9, a flow rate of the counter gas 13, and the like, which are analysis conditions, are different depending on an analysis object. Therefore, a gas flow in the ion source container 15 differs for each analysis object. Depending on the conditions, it is expected that the circulation flow (vortex) 43 is generated and a problem caused by the generation is generated. Therefore, in a third embodiment of the invention, an operation procedure for checking whether the curtain gas 41 sufficiently acts will be described. The configuration of the mass spectrometer 100 is the same as that of the first and second embodiments.

Figure 10:
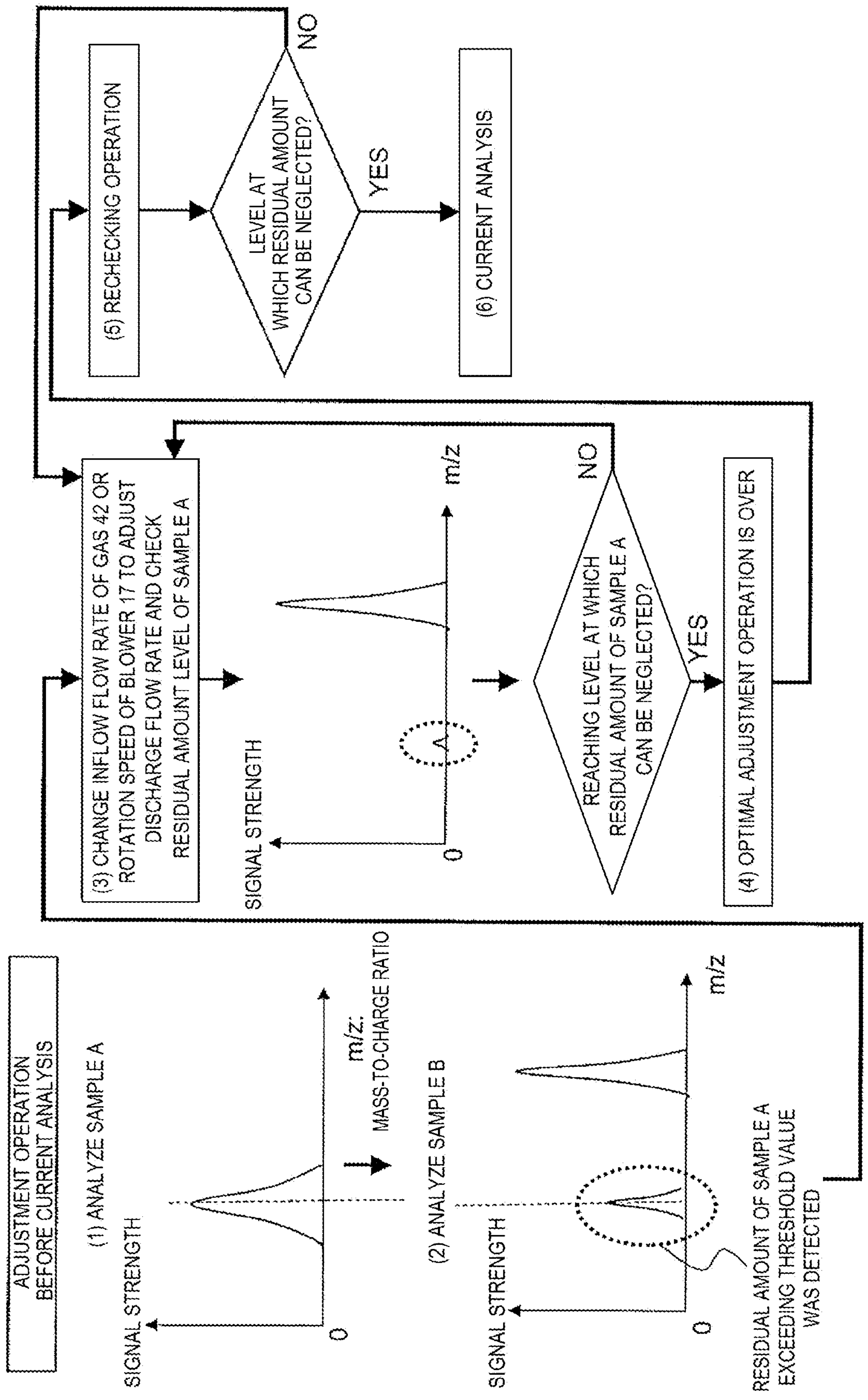
FIG. 10 is a flowchart showing a procedure for checking an action of a curtain gas 41.

FIG. 10 is a flowchart showing a procedure for checking the action of the curtain gas 41. Hereinafter, each procedure will be described with reference to FIG. 10.

First, a sample A is analyzed using the mass spectrometer 100 (step 1). As an analysis result, a detection signal distribution corresponding to the sample A is obtained. Next, a sample B is analyzed (step 2). Here, it is assumed that a residual component of the sample A exceeding a threshold value (determination value) is detected. It is considered that this residual component is generated by the circulation flow (vortex) 43 inside the ion source container 15.

The mass flow controller 51 increases or decreases the inflow amount of the gas 42, or increases or decreases the rotation speed of the blower 17 when an inlet of the gas 42 is open to the atmosphere (step 3). Both of these operations may be performed. As a result, the flow rate of the curtain gas 41 inside the ion source container 15 is changed. Thereafter, a residual amount of the sample A is checked again. An operation of changing the flow rate of the curtain gas 41 is repeated until the residual amount of the sample A is equal to or less than the threshold value (determination value) (step 4).

Since the sample A flows to the downstream side even when the sample A is left unattended, the detection amount is gradually reduced. Therefore, even when the residual amount of the sample A is equal to or less than the threshold value, the result may due to a worker taking time and effort in step 3 and step 4. Therefore, rechecking is performed under the same conditions (step 5). When the residual amount of the sample A is not equal to or less than the threshold value, the processing returns to step 3 and the same procedure is repeated. When the residual amount of the sample A is not equal to or less than the threshold value even when the rechecking is repeated a predetermined number of times, it is considered that the device is abnormal or the inside of the ion source container 15 is already contaminated, and thus an alarm is issued and the mass spectrometer 100 is stopped.

When the residual amount of the sample A is equal to or less than the threshold value, it is determined that generation of the circulation flow (vortex) 43 inside the ion source container 15 is prevented, and the current analysis is performed (step 6). According to the above procedure, the curtain gas 41 can reliably act, and a highly accurate analysis can be performed in which an influence of carryover and cross-contamination is prevented.

Modifications of Invention

In the above embodiments, the outlet holes 49 of the gas supply member 48 are not necessarily arranged at equal intervals. For example, the number of outlet holes 49 may be increased at a position at which a larger amount of curtain gas 41 is desired to flow. Similarly, the number of outlet holes 49 may be increased at a position at which the flow velocity of the curtain gas 41 is desired to be reduced.

In the above embodiments, the ion source 3 using an electrospray ionization method as the ionization method has been described. Alternatively, the ion source 3 using an atmospheric pressure chemical ionization method, a chemical ionization method (CI method), an electron impact ionization method (EI method), or the like may be used. An ECR (microwave) plasma ion source, an inductively coupled plasma ion source, a penning ion source, a laser ion source, or the like may be used as the ion source 3.

In the above embodiments, a quadrupole mass spectrometer has been exemplified as the mass spectrometer 100. Alternatively, a time of flight mass spectrometer (TOF/MS), a fourier transform ion cyclotron resonance mass spectrometer, and a magnetic sector mass spectrometer may be used.

REFERENCE SIGN LIST

1 sample solution
2 syringe pump
3 ion source
4 capillary
5 peak tube
6 nebulizer gas pipe
7 nebulizer gas
8 auxiliary heating gas pipe
9 auxiliary heating gas
10 ion
11 ion generation region
12 counter plate
13 counter gas
15 ion source container
16 monitoring window
17 blower
18 exhaust pipe
19 discharge
21 first pore
22 axis shifting unit
23 first differential exhaust chamber
24 dry pump
25 ion guide
26 second pore
27 ion thermalizer
28 third pore
29 turbo molecular pump
30 second differential exhaust chamber
31 triple quadrupole
32 dry pump
33 analysis chamber
36 conversion dynode
37 scintillator
38 electron multiplier
39 analog/digital converter
40 monitor
41 curtain gas
42 gas
43 circulation flow (vortex)
44 gas flow
45 centralized exhaust pipe
48 gas supply member
47 inlet hole
49 outlet hole
51 mass flow controller
52 gas source
55 guide plate

The invention claimed is:

1. A mass spectrometer comprising:

an ion source that generates ions;

a container that accommodates the ion source;

a first gas supply unit that supplies a first gas used by the ion source to generate the ions to the ion source;

an exhaust unit that exhausts the first gas from the container; and a second gas supply unit that supplies a second gas that flows toward the exhaust unit along an inner wall of the container inside the container and outside the ion source, wherein a discharge port through which the second gas supply unit discharges the second gas is arranged on an upstream side of a discharge port through which the ion source discharges the first gas in a direction in which the first gas flows, the second gas supply unit supplies the second gas so as to flow from the upstream side toward the exhaust unit, the second gas supply unit includes a member including an inlet hole for introducing the second gas and an outlet hole for discharging the second gas, and the outlet hole is arranged on an outer side of an ejection port, from which the ion source ejects the first gas, when viewed from a center of the ion source on a plane perpendicular to a flow path through which the first gas passes through the inside of the ion source.

2. The mass spectrometer according to claim 1, wherein a flow path resistance generated by the outlet hole is larger than a flow path resistance generated by the inlet hole.

3. The mass spectrometer according to claim 2, wherein the number of the outlet hole is larger than the number of the inlet hole.

4. The mass spectrometer according to claim 2, wherein a hole diameter of the outlet hole is smaller than a hole diameter of the inlet hole.

5. The mass spectrometer according to claim 2, wherein a flow path length of the outlet hole is larger than a flow path length of the inlet hole.

6. A mass spectrometer comprising:

an ion source that generates ions;

a container that accommodates the ion source;

a first gas supply unit that supplies a first gas used by the ion source to generate the ions to the ion source;

an exhaust unit that exhausts the first gas from the container;

a second gas supply unit that supplies a second gas that flows toward the exhaust unit along an inner wall of the container inside the container and outside the ion source; and a gas supply device that supplies the second gas, wherein the gas supply device supplies the second gas such that a flow velocity of the second gas is lower than a flow velocity of the first gas.

7. A mass spectrometer comprising:

an ion source that generates ions;

a container that accommodates the ion source;

a first gas supply unit that supplies a first gas used by the ion source to generate the ions to the ion source;

an exhaust unit that exhausts the first gas from the container; and a second gas supply unit that supplies a second gas that flows toward the exhaust unit along an inner wall of the container inside the container and outside the ion source, wherein the exhaust unit includes an exhaust pipe that tapers from the exhaust unit toward the ion source, and an intake port of the exhaust pipe is arranged at a position where a central axis of the ion source is extended.

8. A mass spectrometer comprising:

an ion source that generates ions;

a container that accommodates the ion source;

a first gas supply unit that supplies a first gas used by the ion source to generate the ions to the ion source;

an exhaust unit that exhausts the first gas from the container;

a second gas supply unit that supplies a second gas that flows toward the exhaust unit along an inner wall of the container inside the container and outside the ion source; and a guide plate that guides the second gas along the inner wall of the container.

9. The mass spectrometer according to claim 8, wherein a side wall of the container has a curved shape, and the guide plate is curved so as to guide the second gas along the curved shape.

10. A mass spectrometer comprising:

an ion source that generates ions;

a container that accommodates the ion source;

a first gas supply unit that supplies a first gas used by the ion source to generate the ions to the ion source;

an exhaust unit that exhausts the first gas from the container;

a second gas supply unit that supplies a second gas that flows toward the exhaust unit along an inner wall of the container inside the container and outside the ion source;

a measurement unit that measures an amount of a substance contained in a sample by using the ions; and a control unit that controls at least one of a flow rate of the second gas or an exhaust amount from the exhaust unit, wherein the measurement unit measures a first sample containing a first substance, and then measures a second sample containing a second substance, and the control unit performs at least one of increasing the flow rate of the second gas or increasing the exhaust amount from the exhaust unit when the first substance is detected to be equal to or more than a threshold value in a measurement result of the second sample by the measurement unit.

11. The mass spectrometer according to claim 10, wherein the control unit repeats the at least one of increasing the flow rate of the second gas or increasing the exhaust amount from the exhaust unit until an amount of the first substance detected by the measurement unit is less than the threshold value, when the amount of the first substance detected by the measurement unit is less than the threshold value, the measurement unit remeasures the first sample and then remeasures the second sample, and the control unit performs the at least one of increasing the flow rate of the second gas or increasing the exhaust amount from the exhaust unit when the first substance is detected to be equal to or more than the threshold value in a measurement result of the second sample by the remeasurement.

* * * * *